UNITED STATES PATENT OFFICE.

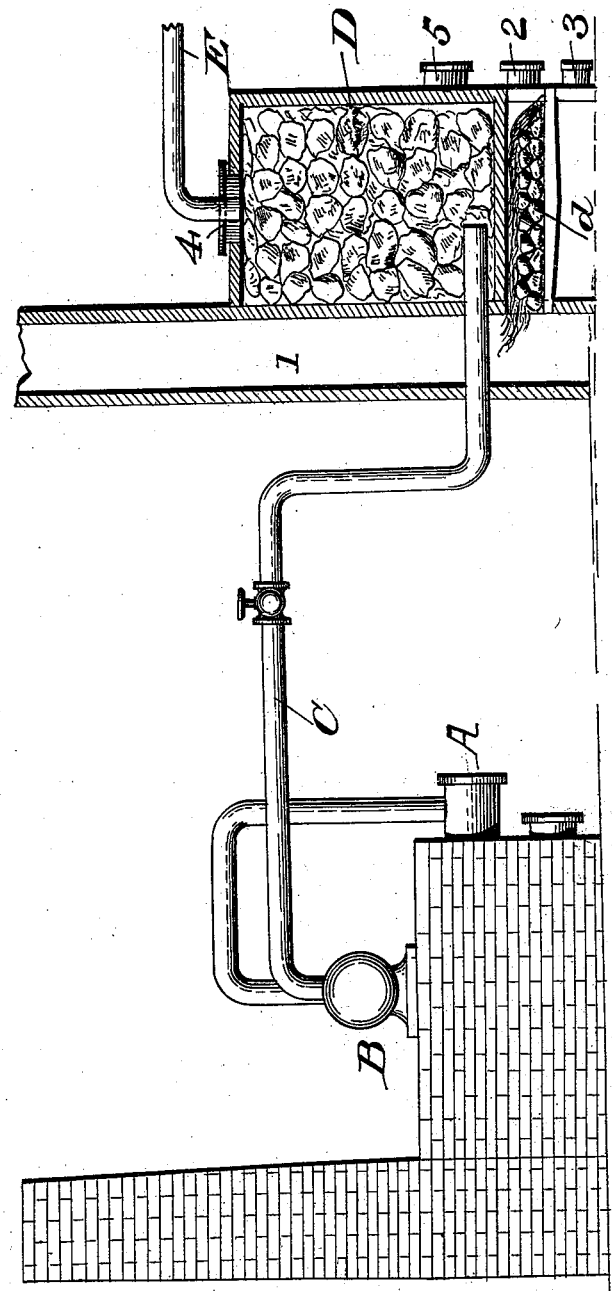

MOTT P. GOFF, OF MATTITUCK, NEW YORK, ASSIGNOR TO THE NATIONAL ELECTRIC GAS COMPANY, OF KENTUCKY.

METHOD OF MANUFACTURING GAS.

SPECIFICATION forming part of Letters Patent No. 507,491, dated October 24, 1893.

Application filed November 30, 1892. Serial No. 453,643. (No specimens.)

*To all whom it may concern:*

Be it known that I, MOTT P. GOFF, a citizen of the United States, residing at Mattituck, in the county of Suffolk, State of New York, have invented certain new and useful Improvements in Methods of Manufacturing Illuminating and Fuel Gas; and I do hereby declare the following to be a full, clear, and exact description of the invention, such as will enable others skilled in the art to which it appertains to make and use the same.

My invention relates to an improvement in methods of manufacturing coal gas for illuminating or fuel purposes. In the manufacture of such gases it has been common heretofore to pass the products of distillation through a mass of heated broken bricks and pumice stone, the friction of which aids in removing from the gases the uncombined particles of carbon, after which the gases go through other steps of purification to remove the sulphur.

The object of my invention is to provide for efficiently and thoroughly removing the sulphur and sulphureted hydrogen from the gases above mentioned, as well as the solid carbon and the hydrocarbons from such gases.

To this end the invention consists in passing the gaseous products of the distillation of coal, through limestone, at a red heat as more fully hereinafter described. The limestone at such heat, parts, or is just parting with its carbonic acid gas and is in a nascent state, a condition peculiarly adapted to permit it to combine with other substances or gases for which it has strong chemical affinity. The sulphurous products and gases from coal have such an affinity for lime, in a marked degree, and are readily removed from the coal gas thereby.

In the accompanying drawing forming part of my invention, the letter A designates a retort of ordinary construction, and mounted on a suitable furnace. The said retort is connected with the hydraulic main B in the usual manner, and the hydraulic main is connected with the purifying chamber D by means of a pipe C. The said chamber consists of a closed retort having a proper filling aperture for charging it with limestone and a suitable cap or door 4 for closing it when filled. Below the retort is a fire chamber *d* provided with a suitable grate and opening at one end into the uptake or chimney 1.

The numerals 2 and 3 indicate doors for the insertion of fuel and the removal of ashes.

The numeral 5 indicates a door for the removal of the burnt lime and E a pipe for the discharge of the purified gas.

The operation of the invention is as follows: The retort D being filled with limestone, and a fire started in the furnace below, when the limestone is heated to a red heat and its carbonic acid gas is being given off, coal gas from the retort A is allowed to pass into the retort D near its bottom, rising upward through the mass. As the limestone is just being converted into lime and the lime is in a nascent state, when met by the incoming gases, the sulphurous acid, and sulphureted hydrogen and other sulphur compounds which have a decided affinity for the lime, are absorbed and taken up in the place of the carbonic-acid gas just given off or being given off, thoroughly purifying the gas. The lime also acts as a scrubber, for removing the free carbon and heavy hydrocarbons from the gas, thus enabling me to combine the process of scrubbing and chemical purification.

As the limestone is converted into lime in the retort D, by the heat applied thereto, and as the purification takes place mostly in the lower part of the retort, there is a large proportion of practically pure lime produced, which is equal in commercial value to ordinary lime, and becomes an important by-product, and serves to cover all the expense of removing the sulphur products and uncombined carbon from the gas.

Having thus fully described my invention, what I claim, and desire to secure by Letters Patent, is—

The process of manufacturing coal gas, which consists in distilling the coal, passing the distilled coal gases through a retort containing a body of limestone constantly heated from the outside, thereby removing the sulphur and other impurities from the gas, at the same time converting the limestone into
5 commercial lime, and periodically feeding limestone and removing the lime, substantially as described and for the purpose set forth.

In testimony whereof I affix my signature in presence of two witnesses.

MOTT P. GOFF.

Witnesses:
 DAVID B. GERRETT,
 PATRICK S. WARD.